United States Patent
Hall

(10) Patent No.: US 6,690,272 B2
(45) Date of Patent: Feb. 10, 2004

(54) FRONT SAFETY LIGHT FOR ALERTING BRAKING CONDITIONS OF A VEHICLE

(76) Inventor: Darren K. Hall, P.O. Box 216, Horseshoe, NC (US) 28742

( * ) Notice: Subject to any disclaimer, the term of this patent is extended or adjusted under 35 U.S.C. 154(b) by 0 days.

(21) Appl. No.: 10/095,168

(22) Filed: Mar. 11, 2002

(65) Prior Publication Data

US 2003/0169165 A1 Sep. 11, 2003

(51) Int. Cl.[7] .............................. B60Q 1/22; B60Q 1/26; B60Q 1/56; B60Q 3/04; G08G 1/07
(52) U.S. Cl. ........................ 340/479; 340/463; 340/468; 340/925; 362/499; 362/541; 362/543
(58) Field of Search .................................. 340/479, 463, 340/464, 468, 466, 467, 925; 362/499, 541, 543

(56) References Cited

U.S. PATENT DOCUMENTS

| | | | |
|---|---|---|---|
| 1,553,959 A | 9/1925 | Pirkey | 362/503 |
| 3,364,384 A | 1/1968 | Dankert | 315/79 |
| 4,990,887 A | * 2/1991 | Lee | 340/479 |
| 5,255,165 A | * 10/1993 | Cail | 362/541 |
| 5,373,426 A | * 12/1994 | O'Sullivan | 362/496 |
| 5,758,944 A | * 6/1998 | Jandron | 362/499 |
| 5,788,358 A | 8/1998 | Davis | 362/83.1 |
| 5,798,691 A | 8/1998 | Tim Kao | 340/479 |
| 5,966,073 A | 10/1999 | Walton | 340/479 |

* cited by examiner

*Primary Examiner*—Jeffery Hofsass
*Assistant Examiner*—Lam P Pham
(74) *Attorney, Agent, or Firm*—Joseph T. Guy; Nexsen Pruet Jacobs & Pollard, LLC

(57) ABSTRACT

An accessory brake light system for a vehicle comprising a secondary brake light attached to a front of said vehicle. A power source is provided for supplying power to a primary brake light. The primary brake light is attached to the rear of the vehicle. A switch connects the power to the primary brake light when the brake is engaged by an operator which causes the primary brake light to illuminate. A delay mechanism is provided which is capable of determining a delay period after the brake is engaged and the power is connected to the secondary brake light after te delay period thereby illuminating the secondary brake light.

17 Claims, 4 Drawing Sheets

FRONT SAFETY LIGHT FOR ALERTING BRAKING CONDITIONS OF A VEHICLE

TECHNICAL FIELD

The present invention is related a safety device for a vehicle comprising front and side facing brake lights which alert a crossing motorist or pedestrian that the oncoming vehicle is applying the brakes.

BACKGROUND

The use of lights to indicate the intentions, or actions, of the operator in a motor vehicle are well know. Brake lights and turn signals are now common place on vehicles. Of particular interest for the present invention are brake lights.

There is little argument that the utilization of brake lights severely limits the number of accidents. Particularly, brake lights on the rear of a vehicle alert following operators that the vehicle brake is engaged. The operator of the following vehicle can then also apply the brake thereby reducing the likelihood that the vehicles will collide.

A large number of collisions between vehicles, or between a vehicle and pedestrian, occur at intersecting roads. It is not uncommon for a vehicle to travel through a stop signal while either totally ignoring the signal or attempting to get through the intersection prior to cars entering the intersection from a different direction. This is especially a problem when other cars at the intersection assume that the cars approaching the intersection are applying the brakes. Unfortunately, the application of the brakes is not easily determined from the front of a vehicle.

Yet another problem is associated with pedestrians attempting to cross at an intersection. It is common practice to await the appearance of a red signal light for approaching vehicles prior to crossing the intersection. If, however, a vehicle does not stop the pedestrian may step into the street and be struck by the vehicle crossing through the intersection.

There are other examples where a person, or vehicle, may incorrectly interpret the actions of an approaching vehicle and stray into the path of the approaching vehicle only to be struck by the vehicle. If these types of collisions could be eliminated, or even mitigated, the number of injuries and fatalities occurring by vehicle traffic would diminish.

One approach to solving this problem is the use of a forward facing brake, or indicator, light. Descriptions of this approach are many.

U.S. Pat. No. 1,553,959 to Pirkey describes a stop signal which may be readily visible to drivers in the front and back of the vehicle. It is apparent to even a casual observer that the utilization of front brake lights has not been considered useful in the approximately 80 years since the issuance of the Pirkey patent.

U.S. Pat. No. 3,364,284 to Dankert describes a speed controlled signal system which indicates the drivers actions. Not only does the system of Dankert provide information regarding a stop but also the change in speed of vehicle. The complexity of the lighting system has never reached widespread acceptance.

U.S. Pat. No. 5,788,358, issued to Davis, describes a forward facing brake light which is attachable to a rear view mirror. Among other problems the reflection of the light may be a distraction to the driver. Furthermore, in many vehicles the upper portion of the windshield glass is tinted to act as a sun shield. This sun shield would limit the ability of a person forward of the vehicle to easily distinguish the light. If the light is lower than the mirror it would obscure the visibility of the driver which has obvious bad consequences.

U.S. Pat. No. 5,798,691 describes a brake light system for the front of a vehicle which utilizes LED's. The device is easily attached to the grill of a vehicle.

U.S. Pat. No. 5,966,073 describes a combination brake/turn signal light. The complicated utilization of various color schemes has not reached wide spread acceptance.

The prior art all considers the same general solution to the problem of alerting the intentions of the driver to observers forward of the car. In general, the prior art adapts a light, like the rear brake light, to the front of the vehicle in some fashion. This application has never materialized into widely accepted practice.

While not restricted to any theory, applicants submit that part of the lack of utilization of forward facing brake lights is that the lights, contrary to the wide held belief in the art, could create additional hazards. For example, when a vehicle approaches an intersection the light may transition from green to amber to red. It is not uncommon for an operator to initially attempt to stop, or slow down, by applying the brakes momentarily thereby illuminating any brake indicator lights on the vehicle. After applying the brakes it is not uncommon for the operator to realize that the distance required for stopping exceeds the distance to the intersection and the operator then lifts the brake and coast, or accelerates, through the intersection. If an observer, pedestrian or other vehicle operator, sees the brake light illuminate they assume that the vehicle will stop and proceed into the intersection. The operator of the approaching vehicle may then enter the intersection after the aborted stop and collide with the pedestrian or other vehicle. In this unfortunate, but realistic, scenario the intentions of the operator provide a false indication thereby increasing the likelihood of a collision due to the aborted stop.

There has been a long felt desire in the art for an apparatus which can alert an observer of the intentions of a vehicle operator to stop the vehicle. There has been an even greater desire to provide such an indication without providing false indications which may be worse, in many situations, than no indication. The present invention provides a novel approach to the problems described herein at a reasonable cost.

SUMMARY

It is an object of the present invention to provide a safety feature for a vehicle which is capable of decreasing the number of collisions between vehicles and between vehicles and pedestrians.

It is another object of the present invention to provide a forward facing brake light which decreases the occurrence of false indications of operator intentions.

A particular feature of the present invention is the incorporation of a delay period between the time the brake mechanism is engaged and the time the front light is illuminated.

Another particular feature of the present invention is the simplicity and the ability to utilize the invention in existing vehicles or to incorporate the invention in cars during manufacture.

A particular advantage is the economical implementation of the present invention.

These and other objects, features and advantages will be realized from the description wherein provided is an accessory brake light system for a vehicle comprising a secondary brake light attached to a front of said vehicle. A power source is provided for supplying power to a primary brake light. The primary brake light is attached to the rear of the vehicle. A switch connects the power to the primary brake light when the brake is engaged by an operator which causes the primary brake light to illuminate. A delay mechanism is provided which is capable of determining a delay period after the brake is engaged and the power is connected to the secondary brake light after te delay period thereby illuminating the secondary brake light.

Yet another embodiment is provided in an accessory brake light system for a vehicle. The vehicle comprises a front, a rear, a brake engagement switch and a brake light attached to the rear which illuminates when the brake engagement switch is activated. The system comprises a secondary brake light attachable to the front of the vehicle. A delay mechanism capable of determining a delay period is provided. When the brake engagement switch is activated the delay period passes prior to the secondary brake light illuminating.

Yet another embodiment is provided in an accessory for attachment to a vehicle. The vehicle comprises an electrical circuit comprising a brake engagement switch and a power source. The accessory comprises a couple attachable to the circuit. A secondary circuit is connecting to the couple and to a brake light wherein the brake light is attachable to the front of the vehicle. A delay mechanism is provided which is capable of delaying illumination of the secondary brake light for a delay period from when the brake engagement switch is activated.

DETAILED DESCRIPTION

The present invention provides a forward brake light on a car which has a built in delay period between activation of the brake and illumination of the light. The delay period decreases the likelihood of a false indication that a vehicle operator is intending to stop the vehicle.

The invention is described with reference to the various figures wherein similar elements are numbered accordingly. The figures represent preferred embodiments and do not limit the scope of the invention.

Figure 1:
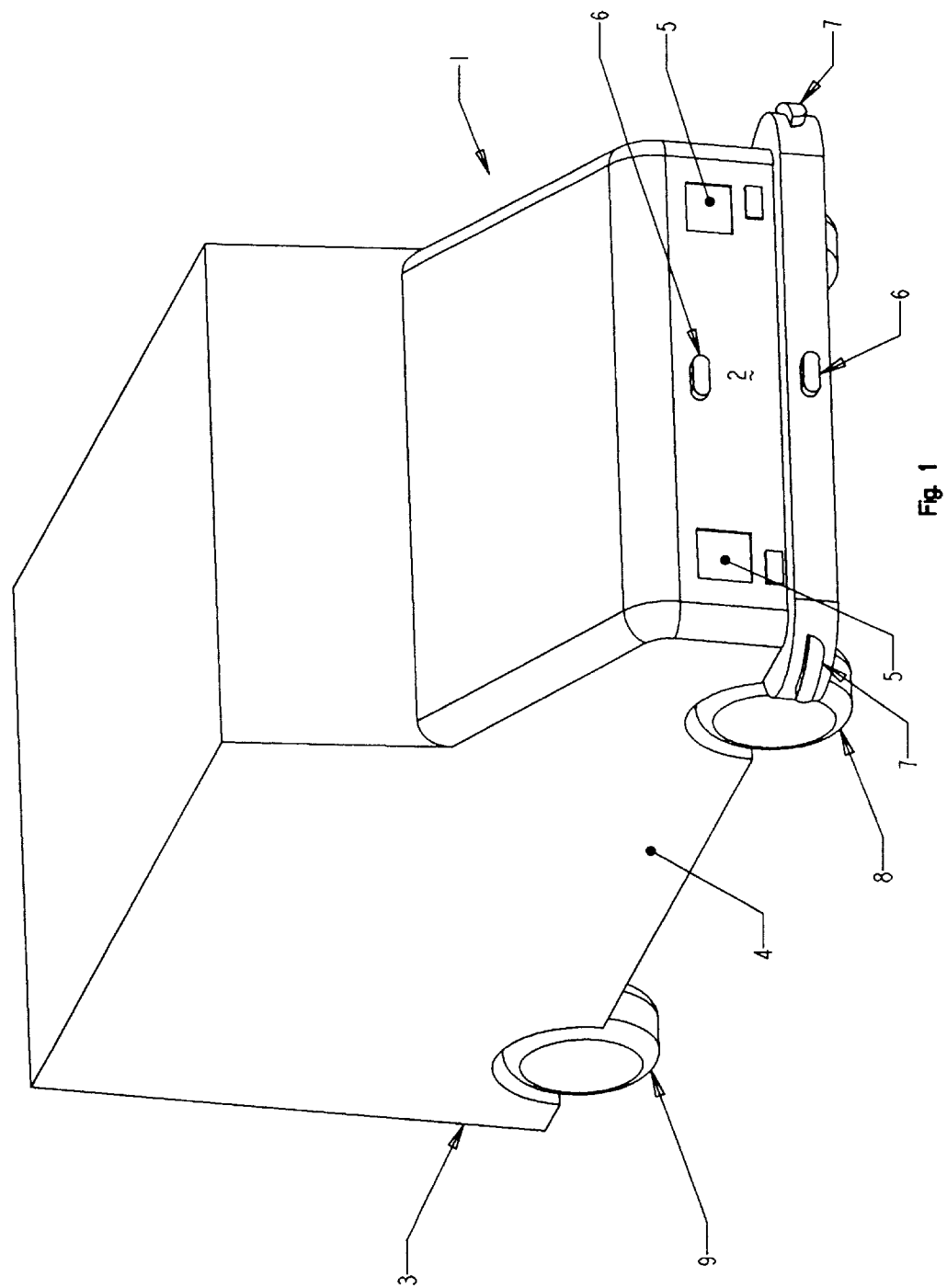
FIG. 1 is a front perspective view of an embodiment of the present invention as incorporated on a vehicle

An embodiment of the present invention is provide in FIG. 1. In FIG. 1, a vehicle, generally represented at 1, comprises a front, 2, rear, 3, and sides, 4, as commonly defined for vehicles. The transition between the sides, 4, and front, 2, may be rounded to decrease wind resistance or for aesthetics. Attached to the front, 2, of the vehicle, 1, is at least one forward facing head lamp, 5, which has the primary function of illuminating the road during night driving. In the present invention at least one secondary brake light, 6, is provided which is observable from in front of the vehicle. In an alternate embodiment at least one tertiary brake light, 7, is provided. The tertiary brake light, 7, is towards the side of the vehicle and is therefore visible from in front of the vehicle, such as in the path of travel, or from the side of the vehicle, such as out of the path of the vehicle but forward of the front wheel, 8, or rear wheel, 9.

The secondary brake light, 6, and optional tertiary brake light, 7, are characterized by their illumination which occurs at least 0.1 seconds after the brake mechanism is engaged by the driver. In a more preferred embodiment the secondary, and optional tertiary brake light, illuminate at least 0.2 seconds after the brake mechanism is engaged by the driver. It is most preferred that the secondary and optional tertiary brake light illuminate at least 0.5 seconds after the brake mechanism is engaged by the driver. It would be apparent from the description herein that the delay period between engagement of the brake pedal and illumination of the secondary or optional tertiary brake light is sufficiently long to insure that the brake mechanism is not simply tapped but is engaged in a manner to stop the vehicle. If, for example, the vehicle operator initially engages the brake pedal but then decides to proceed the secondary brake light would preferably not illuminate thereby avoiding the inaccurate indication that the operator intends to stop the vehicle. It would also be apparent that the delay period must be sufficiently short that the light is illuminated prior to stopping. It is most preferred that the delay period between engaging the brake mechanism and illumination of the secondary and optional tertiary brake light be no more than 1.5 seconds. More preferably, the delay period is no more than 1 second and most preferably the delay period is no more than 0.75 seconds. In a particularly preferred embodiment the delay period between activation of the brake mechanism and illumination is between 0.5 and 0.75 seconds. The delay period may also be variable and a function of the speed of the vehicle. For example, if the vehicle is traveling faster the delay period may be longer to insure that the vehicle operator does not abort the stop in close proximity to the intersection. It is also contemplated that the secondary brake light have a delay period which differs from the delay period of the tertiary brake lights. For example, the secondary brake light may illuminate after a first delay period and the tertiary brake lights may illuminate after a second delay period. It is most preferable that the second delay period be longer than the first delay period.

The secondary brake light is preferably located on the front of the vehicle centrally located between the forward facing head lamps. If multiple secondary brake lights are employed they may be symmetrically placed about the center line of the vehicle. It is preferred that the secondary brake light be either below or above the line defined by the center of the headlights to avoid visual interference between the light emitted by the forward facing head lamps and the secondary brake light. In one embodiment the secondary brake light is below the line defined by the center of the headlights. This is preferred since the light emitted by the secondary brake light would be less distracting to the vehicle operator. In another embodiment the secondary brake light is above the line defined by the center of the headlights. In this embodiment it is most preferred that the secondary brake light have a light shield to decrease the amount of light which is emitted towards the vehicle which could distract the vehicle operator.

Figure 2:
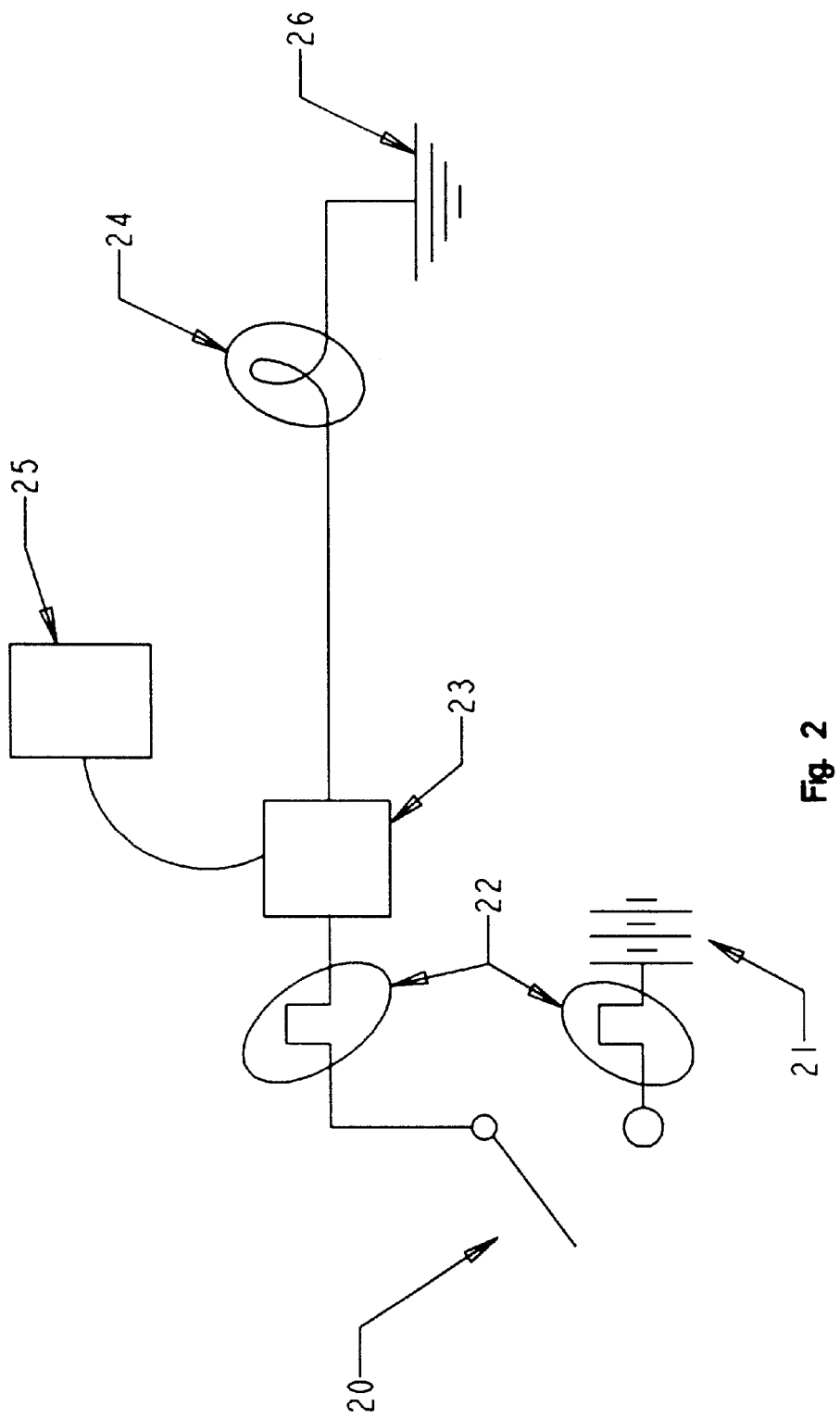
FIG. 2 is a schematic representation of a circuit diagram of the present invention.

A representative circuit diagram of the present invention is provided in FIG. 2. In FIG. 2, the brake switch, 20, is closed when the brake mechanism is activated, or engage by the operator, and open when the brake mechanism is not activated as common in the art. The operational details of the brake switch are not limited herein and may include any of the commonly employed switches employed to illuminate a vehicle brake light. It is most preferred that the brake switch be between the various components and the power source, 21, with the exception of an optional but preferred fuse, 22, which may be on either side of the switch, and before or after any component. A delay, 23, delays the time between the closing of the brake switch, 20, and the illumination of the light, 24, as described previously. An optional, but preferred, delay controller, 25, allows the delay period to be altered or programmed if desired. The circuit is typically grounded at 26 as known in the art of circuit design.

Figure 3:
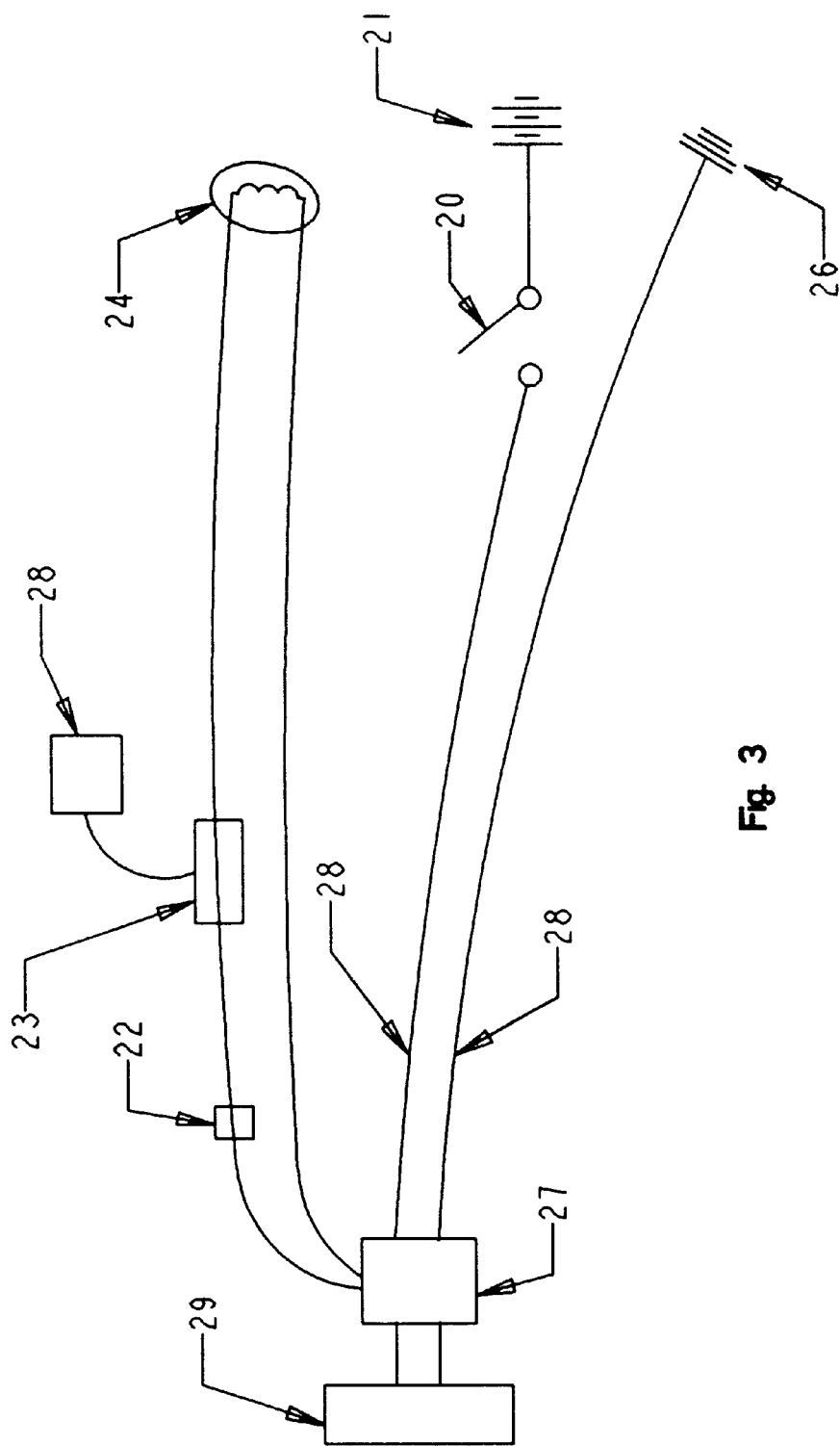
FIG. 3 is a schematic representation of another circuit diagram of the present invention.

An alternate circuit diagram is provided in FIG. 3. In FIG. 3, the existing rear brake light circuit may be employed. Existing rear brake light circuits comprise a brake switch, 20, which closes the circuit between the power source, 21, and ground, 26, thereby illuminating the light of the brake light assembly, 29. A couple, 27, attached to the wires, 28, allows the power to the brake light assembly to be similarly sent to a secondary circuit comprising an optional fuse, 22, delay, 23, optionally with an associated delay controller, 25, and light, 24. The embodiment illustrated in FIG. 3 is preferred due to the ease with which existing vehicles could be retrofitted with the inventive braking light system. Many vehicles currently employ a factory installed couple just prior to the brake light assembly. In a particularly preferred embodiment the couple is a t-connection wherein the factory installed couple connects with the couple associated with the inventive device. T-couples are well known to provide a junction in a wiring circuit. The factory installed couple is disengaged and re-engaged into each side of a t-connection couple of the present. A particularly preferred embodiment has a molded t-connection component with wires integral thereto. The wires would then be run along the frame, or other suitable location of the vehicle, to a location suitable for mounting the light, 24.

Figure 4:
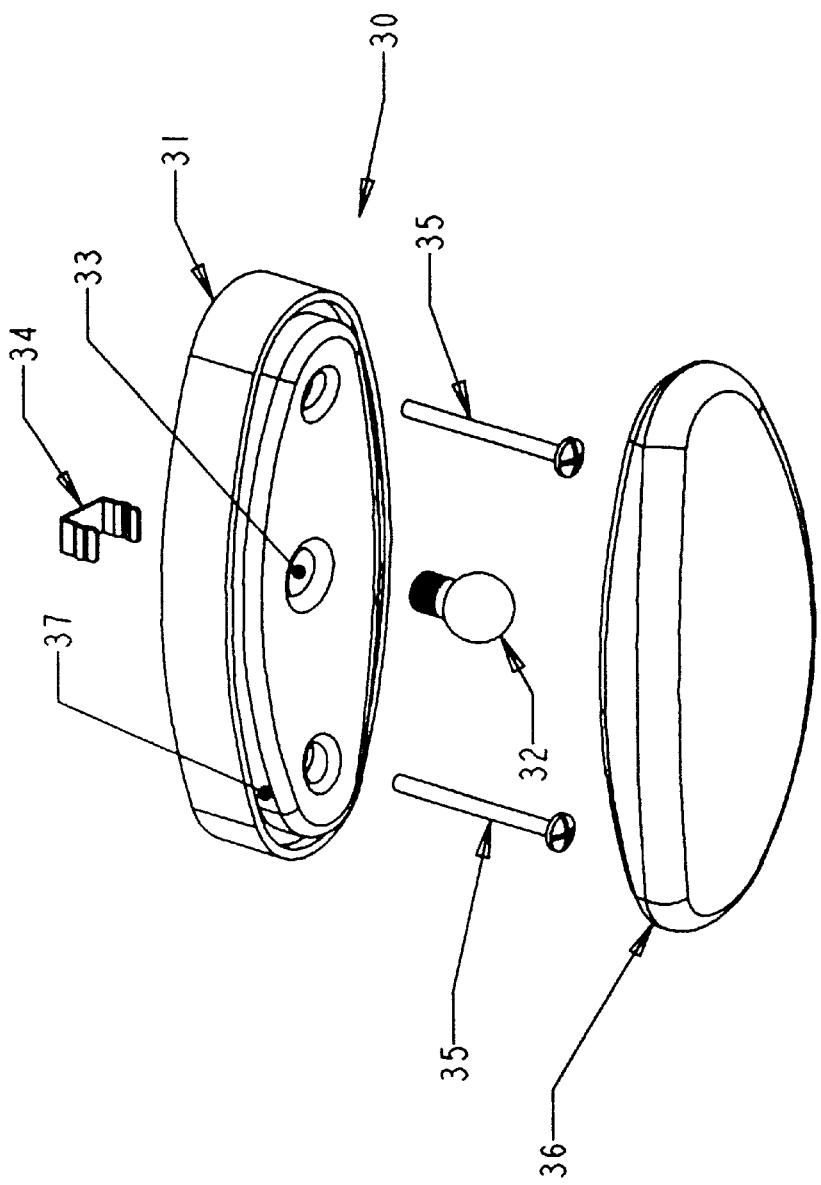
FIG. 4 is a perspective exploded view of a preferred light assembly of the present invention.

A preferred light assembly is illustrated in perspective exploded view FIG. 4. In FIG. 4, the light assembly, generally represented at 30, comprises a base, 31. The base, 31, receives a bulb, 32, in a bulb void, 33. The bulb, 32, reversible engages with a socket, 34. The bulb and socket may utilize mating threads, post and slots, or tension based reception techniques as known in the art of vehicle lights. The base, 31, may be secured to the vehicle by securing devices, 35, such as threaded members, rivets, and the like or the securing devices may include adhesives, snap fittings, hoop and latch systems and the like. A lens, 36, preferably snap fits into a recession, 37, of the base, 31.

The shape of the secondary brake light is preferably rounded or elliptical. An elliptical light is more preferred for aesthetics and due to the increased ability to rapidly distinguish an elliptical shaped light in an environment where many lights are in the field of visual view. A particularly preferred secondary brake light is in shape commonly referred to as "cat-eye" which is approximately equivalent to the overlap region of two similar circles.

The light is not particularly limiting in the present invention. Filament based lights are typically employed for brake lights and these would be suitable for the present invention. Diodes, halogen lights, or laser based lighting methods may be employed without departing from the scope of the present invention.

The color of the secondary brake light is typically controlled by the choice of lens color or the color of the light bulb. Most preferably, white emitting light bulbs are employed with colored lens. It is most preferably that the secondary brake light not be white since this is easily confused with headlights and would not be distinguishable. Red lights are commonly employed for brake lights and universally signal danger. Red emitting secondary brake lights are a preferred embodiment. Amber lights are also a preferred embodiment due to the distinction between amber lights and other lights commonly employed in a vehicle.

The delay mechanism may be a single component or the light may comprise a delay mechanism which is integral thereto. The delay mechanism may provide a fixed delay dependent on current, amperage or other electrical signals or the delay mechanism may be controlled by a controller.

The delay controller may provide vehicle attributes upon which the delay period is based. Particularly preferred attributes include vehicle speed or change therein. For example, the delay period may increase with vehicle speed. Momentum sensors may be employed wherein rapid stopping alters the delay period. Momentum sensors are commonly employed for trailer brake activation and the mechanisms are well documented and commercially available. Mechanisms which detect the angle of the vehicle relative to the road could also be employed. A rapid change in angle may indicate a panic stop which may be utilized to lengthen the delay period, for example. The delay controller preferably does not delay the time between the brake mechanism disengagement and the termination of illumination of the secondary brake light. In one embodiment the delay controller may be a device which can be accessible for entering a delay period such as a keypad, digital or analog dial or other devices commonly employed for altering an electronic device.

The invention has been described with particular reference to preferred embodiments. It would be apparent from the description herein that other embodiments could be employed without departing from the scope of the invention which is set forth in the claims which are appended hereto.

What is claimed is:

1. An accessory brake light system for a vehicle comprising:

a secondary brake light attached to a front of said vehicle;

a power source for supplying power to a primary brake K light wherein said primary brake light is attached to a rear of said vehicle;

a switch which connects said power to said primary brake light when a brake is engaged by an operator thereby causing said primary brake light to illuminate;

a delay mechanism capable of determining a delay period after said brake is engaged and said power is connected to said secondary brake light after said delay period thereby illuminating said secondary brake light.

2. The accessory brake light system of claim 1 wherein said delay period is at least 0.1 seconds to no more than 1.5 seconds.

3. The accessory brake light system of claim 2 wherein said delay period is at least 0.2 seconds.

4. The accessory brake light system of claim 2 wherein said delay period is no more than 1 second.

5. The accessory brake light system of claim 4 wherein said delay period is at least 0.5 seconds to no more than 0.75 seconds.

6. The accessory brake light system of claim 1 further comprising a delay controller.

7. The accessory brake light system of claim 1 further comprising a tertiary brake light attached to said vehicle.

8. The accessory brake light system of claim 7 further comprising a second delay period wherein illumination of said tertiary brake light is delayed for said second delay period after said brake is engaged.

9. An accessory brake light system for a vehicle wherein said vehicle comprises a front, a rear, a brake engagement switch and a brake light attached to said rear which illuminates when said brake engagement switch is activated wherein said system comprises:

a secondary brake light attachable to said front of said vehicle;

a delay mechanism capable of determining a delay period; and when said brake engagement switch is activated said delay period passes prior to said secondary brake light illuminating.

10. The accessory brake light system of claim 9 wherein said delay period is at least 0.5 seconds to no more than 0.75 seconds.

11. The accessory brake light system of claim 9 further comprising a delay controller.

12. The accessory brake light system of claim 9 further comprising a tertiary brake light attached to said vehicle.

13. The accessory brake light system of claim 12 wherein said tertiary brake light is visible from in front of said vehicle or from a side of said vehicle.

14. The accessory brake light system of claim 9 wherein said vehicle further comprises two forward facing head lamps and at least one said secondary brake light is below a line connecting a center of each of said forward facing head lamps.

15. An accessory for attachment to a vehicle wherein said vehicle comprises an electrical circuit comprising a brake engagement switch and a power source wherein said accessory comprises:

a couple attachable to said circuit;

a secondary circuit connecting said couple to a brake light wherein said brake light is attachable to a front of said vehicle;

a delay mechanism capable of delaying illumination of a secondary brake light for a delay period from when said brake engagement switch is activated.

16. The accessory for attachment to a vehicle of claim 15 further comprising a delay controller.

17. The accessory for attachment to a vehicle of claim 15 wherein said delay period is at least 0.1 seconds to no more than 1.5 seconds.

* * * * *